(12) United States Patent
Trabert et al.

(10) Patent No.: US 7,328,138 B1
(45) Date of Patent: Feb. 5, 2008

(54) METHOD AND SYSTEM OF MEASUREMENT AND OPTIMIZATION OF NOISE IN SERVO SYSTEMS

(75) Inventors: Steven G. Trabert, Boulder, CO (US); Matthew Tucker, Lafayette, CO (US); Gerald M. Grammens, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 11/186,664

(22) Filed: Jul. 21, 2005

(51) Int. Cl.
*G11B 5/596* (2006.01)
*G06F 15/00* (2006.01)

(52) U.S. Cl. .................................. 702/191; 360/77.04

(58) Field of Classification Search ................ 702/191
See application file for complete search history.

(56) References Cited

U.S. PATENT DOCUMENTS

| | | | | |
|---|---|---|---|---|
| 5,909,661 | A * | 6/1999 | Abramovitch et al. ...... | 702/191 |
| 6,141,303 | A * | 10/2000 | Supino et al. ........... | 369/44.28 |
| 6,658,370 | B2 * | 12/2003 | Christ et al. ............ | 702/182 |
| 6,853,514 | B2 * | 2/2005 | Li et al. ................. | 360/77.04 |

\* cited by examiner

*Primary Examiner*—John Barlow
*Assistant Examiner*—Jonathan Moffat
(74) *Attorney, Agent, or Firm*—Brooks Kushman P.C.

(57) ABSTRACT

Method and system of measuring and optimization of noise in a servo system. The method and system including features to optimize filtering otherwise reducing noise in the system so as to permit improved system operation.

18 Claims, 1 Drawing Sheet

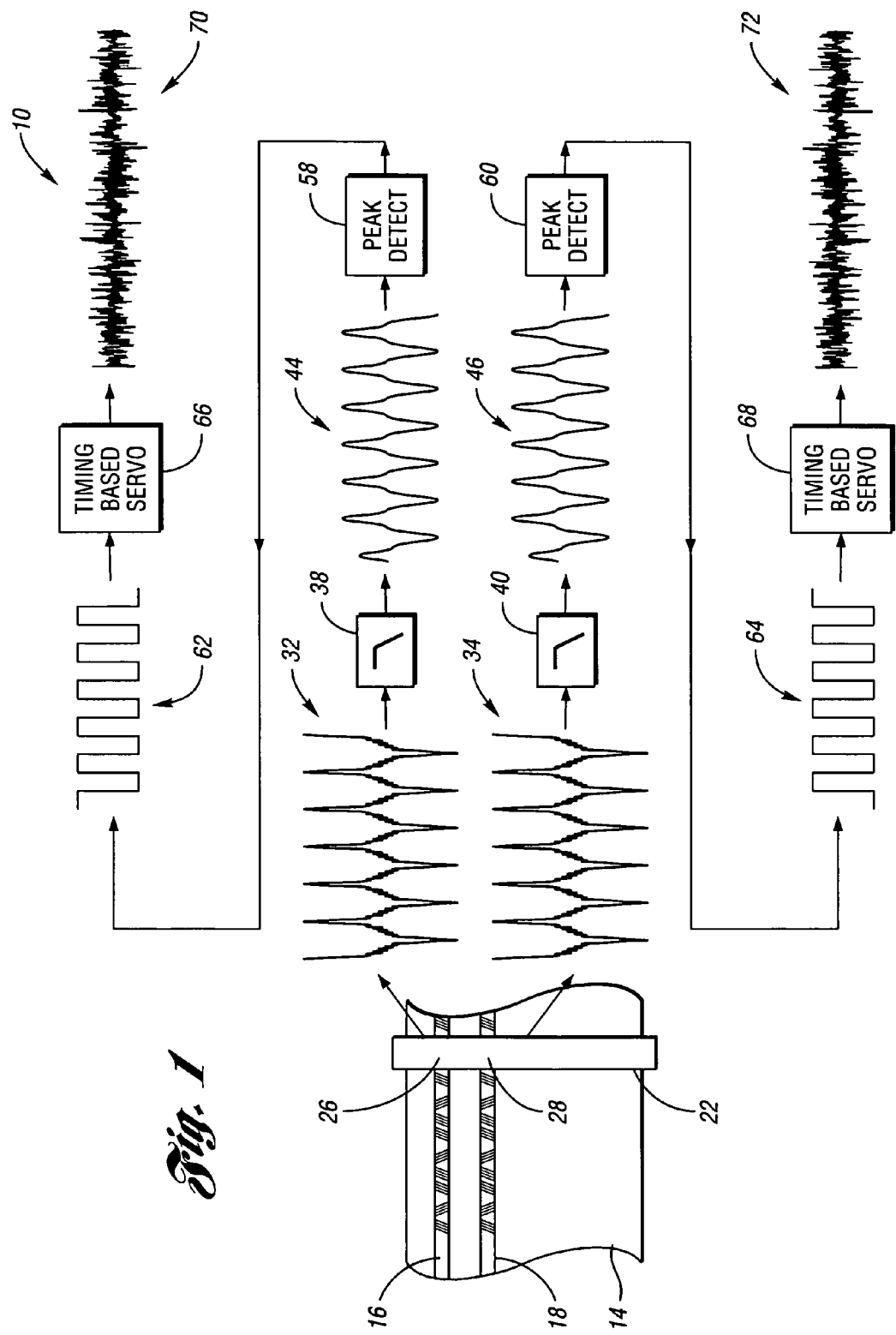

METHOD AND SYSTEM OF MEASUREMENT AND OPTIMIZATION OF NOISE IN SERVO SYSTEMS

BACKGROUND OF THE INVENTION

1. Field of the Invention

The present invention relates to a method and system of measurement and optimization of noise in servo systems.

2. Background Art

Achieving high performance in a servo system requires accurate and precise position error signals (PES). Excessive noise in the PES measurement can significantly deteriorate performance of a servo reader or other feature used to facilitate controlling operation and/or positioning in the servo system. This may limit an ability to precisely position servo heads in a servo system. As such, a need exists to limit noise in the PES.

Another problem with noise in the PES relates to mass production environments where servo readers are included within products produced in large quantities. Naturally, some variation occurs in the ability of the different servo readers to filter out noise in the PES signal. Consequently, some readers for a given product line may pass more noise to the PES signal than others. This can lead to manufacturing variability and other quality control issues. As such, a need exists to test for such manufacturing variable and quality control.

SUMMARY OF THE INVENTION

One aspect of the present invention relates to a method of measuring noise in a servo system having a media head to read media signals from a media element. The method may include determining position error signals (PES) as a function of signals collected by two servo readers, the servo readers reading servo patterns included on the media element; subtracting the PES of one of the servo readers from the other servo reader to determine PES noise; and characterizing the PES noise.

The method may further include modifying the signals collected by the servo readers prior to determining the position error signals, and optionally, filtering the signals collected by the servo readers prior to determining the position error signals.

The method may further include optimizing the PES noise by adjusting the filtering according to a PES noise optimization strategy, which may include adjusting a cut-off frequency of at least one of the filters; adjusting the filtering includes adjusting a cut-off frequency of both filters; and/or adjusting the filtering according to a Steepest Descent Optimization Method, a Gauss-Newton Optimization Method, or a Nelder-Mead Simplex Optimization Method.

The method may further include positioning the head based on the PES determined after implementing the noise optimization strategy, changing the media element to a new media element and optimizing noise in the servo system for the new media element, and/or benchmarking a servo pattern of a media element after adjusting the filtering and testing operation of a plurality of media read devices as a functions of signals read from the benchmarked servo pattern.

One aspect of the present invention relates to a method of positioning a media head to read media signals from a media element in a servo system. The method may include determining position error signals (PES) based on signals collected by two servo readers, the servo readers reading servo patterns included on the media element; subtracting the PES of one of the servo readers from the other servo reader to isolate PES noise; calculating a PES noise value for the PES noise; applying a PES noise optimization strategy to optimize the PES noise value; and positioning the head based on PES determined after implementing the PES noise optimization strategy.

One aspect of the present invention relates to a method of testing servo pattern quality of servo patterns included on a media element. The method may include providing a tape head having two servo readers; providing a benchmarked servo pattern; determining a position error signal (PES) for each of the servo readers as a function of signals collected by the servo readers from the benchmarked servo patterns; optimizing the servo readers as a function of a noise value associated with a difference in noise between the PES signals of the two servo readers; determining a benchmarked PES noise value as a function of signals collected from the benchmarked servo pattern after the optimizing of the servo readers; determining a non-benchmarked PES noise value as a function of signals collected from a non-benchmarked servo pattern after the optimizing of the servo readers; and determining a servo pattern quality of the non-benchmarked servo pattern as a function of a difference between the benchmarked PES noise value and the non-benchmarked PES noise value.

One object of the present invention relates to minimize PES noise by optimally tuning a filter associated with the servo reader that detects and demodulates the raw servo position signals. This may include measuring the PES noise, determining a variance thereof, and using the variance to optimally adjust the filter so that the PES noise is minimized.

One particular advantage of the present invention is that it can be used to tune the frequency cut-off of the servo read channel filter so that optimal performance is achieved. Another particular advantage of the present invention is that since the noise characteristics can be media dependent, the cut-off frequencies can be optimally tuned at run-time so that the optimal performance is achieved for the current media in the servo system.

The above features and advantages, along with other features and advantages of the present invention, are readily apparent from the following detailed description of the invention when taken in connection with the accompanying drawings.

BRIEF DESCRIPTION OF THE DRAWINGS

FIG. 1 schematically illustrates a servo system in accordance with one non-limiting aspect of the present invention.

DETAILED DESCRIPTION OF THE PREFERRED EMBODIMENT(S)

FIG. 1 schematically illustrates a servo system 10 in accordance with one non-limiting aspect of the present invention. The system 10 may include a media element 14 having first and second servo patterns 16-18, a head 22 having first and second servo readers 26-28, and a controller (not shown). The head 22 may be configured to read media signals from the media element 14 as the media element 14 travels across the head 22, such as in tape, disc, or other electronic data storage environments.

The head 22 may be configured to read media signals from any number of different types of media elements 14. The head 22 may be configured to read electromagnetic signals from a magnetic based media element and/or optical signals from an optical based media element. The processing of the signals read by the head 22 may be dependent on a position of the head 22 relative to the media element 14.

The controller may be configured to control the positioning of the head 22, such as to position it relative to the media element 14 for proper reading of signals therefrom. To assist the controller in positioning the head 22, the media element 14 may include the first and second servo patterns 16-18. The servo patterns 16-18 may be read by corresponding first and second servo readers 26-28 on the head 22. The signals from the servo readers 26-28 may be used by the controller to control positioning of the head 22 relative to the media element 14.

The servo readers 26-28 may be affixed to the head 22 such that the positioning of the head 22 may correspond to a positioning of the servo readers 26-28 relative to the servo patterns 16-18. Thus, if the head 22 is moved upwardly, the servo readers 26-28 are similarly moved upwardly to read a top portion of the servo patterns 16-18 and if the head 22 is moved downwardly, the servo readers 26-28 are similarly moved downwardly to read a bottom portion of the servo patterns 16-18.

The raw signals read by the readers 26-28 are generally referred to with reference numerals 32-34. These signals may represent the transition between high and low portions of the servo patterns 16-18 or other values, depending on the configurations of the patterns 16-18. The timing between the peaks of these signals may be based on the positioning of the servo readers 26-28 along their respective servo pattern 16-18. Of course, the present invention contemplates any number of configurations for the servo read patterns 16-18 and is not intended to be limited to the exemplary servo patterns shown in FIG. 1.

If the servo patterns 16-18 are stripes, as shown, opposite sloping portions of the stripes shaped servo patterns 16-18 produce varying time intervals between successive highs, depending on a vertical alignment of the servo readers 26-28 over the servo patterns. If the servo readers 26-28 are positioned at an upper portion of the pattern, then the time between successive highs is less than if the servo reader is positioned at a lower portion of the pattern. This differentiation is used by the controller to position the head 22 relative to the media element 14, i.e. if it is desired that the head read an upper portion of the media element, then the head is controlled such that the servo readers are positioned at an upper portion of the servo read pattern.

First and second filters 38-40 may be applied to the signals 32-34 read by the servo readers 26-28 to smooth chattering and spikes in the signals 32-34 caused by noise in the system 10. This smoothing may be aimed at limiting spikes associated with false peak readings. The filtering may remove or eliminate certain raw signals read from the patterns 16-18, such as to smooth out the signals 32-34 so that their peaks can be more easily detected. The accuracy of detecting the peaks may be important to measuring the time between successive peaks, which, as described above, may be used by the controller to determine and control the position of the head 22. Of course, other conditioning may be used in place of or in conjunction with the filter to better condition the signals.

The filters 38-40 may be adjusted so that certain signals are passed through to the controller for use fine tuning positioning of the head 22. The filters 38-40 may be electronically or mechanically adjusted. Electronic signals may be transmitted from the controller to one or more of the filters 38-40 to adjust the settings associated therewith. These adjustment signals may be generated automatically by the controller, such as based on software or other logic associated therewith, and/or the signals may be inputted to the controller, or other device in communication therewith, by an operator, quality control technician, or other user thereof. Likewise, a user may mechanically adjust the filters 38-40 through dials and other operations or direct inputs thereto.

As shown, a low pass filter may be used to filter the signals 32-34, the output of which is generally referred to with reference numerals 44-46. The low pass filter may be configured to pass all frequencies below a designated cut-off frequency. The frequency may be adjusted, as described above, to facilitate limiting noise in the signal, and thereby, improve reading of the servo patterns 16-18. Of course, the present invention contemplates any number of filters and is not intended to be limited to the filter shown in FIG. 1.

After the signals are filtered, peak detection units 58-60 may be used to detect signal peaks. The peak detection unit 58-60 can be an element of the controller or a standalone item that receives the incoming analog signals and outputs a digital signal representing the signal peaks. The digital output of each peak detection unit 58-60 is generally referred to with reference numerals 62-64.

Timing based servo units 66-68 generally compare the digital peak signals 62-64 from the peak detection units 58-60 to a predefined ratio of time intervals between peaks and outputs a position error signal (PES) 70-72. The time intervals may be selected based on the desired positioning of the head 22. For example, if it is desired to position the head 22 at an upper portion of the media element 14, then the timing of the peaks in the digital peak signals should correspond with a predefined ratio of time intervals associated with the tops of successive highs in the servo read patterns 16-18.

The timing based servo units 66-68 may compare the desired time ratios versus that read by the servo readers 26-28. The difference therebetween may be outputted as the PES 70-72. The PES 70-72 may indicate any difference in timing with upward and downward spikes such that an upward spike occurs if the interval between successive highs is too long and a downward spike occurs if the interval between successive highs is too long. The severity of the spikes may indicate the amount by which the timing is off such that larger offsets indicate more severe timing errors.

Noise is inherent to the servo system 10 and particularly effects the ability of the peak detection units 58-60 to accurately determine the peak of the read signals 32-34. Generally, the noise appears as the chattering and spiking shown in the read signals prior to filtering. Thus, variances in the PES 70-72 may be attributed or related to poor positioning of the servo readers 26-28 or to peak detection errors. If the noise can be reduced or filtered out by the filters 38-40, the accuracy of the peak detection can be maximized such that noise in the PES 70-72 is limited. If the contribution of noise is limited, then a more accurate determination can be made as to the true positioning of the head.

The problem lies in measuring the noise and adjusting the filters 38-40 in response thereto. In accordance with one aspect of the present invention, the noise may be determined by relying on the fact that during track following there are at least two separate servo readers 26-28 providing PES measurements at the same time. Each PES measurement is equal to the true position of the servo reader relative to the servo pattern plus its noise, and can be written as $$PES_i(t) = PES_{True}(t) + n_i(t)$$

where $PES_i$ denotes the measured position, $PES_{true}$ represents the true position, and $n_i$ is the measurement noise for a particular servo channel i at a given time, t. It is important to note that at any given time the true position for each channel is the same as the servo readers are on the same head.

The difference of any two servo channel PES measurements will, over time, provide statistical information on the noise variation of the channels without the influence of the true position variation. In particular, for two servo channels, the following equation illustrates the extraction of the noise from the PES channel measurements.

$$\Delta(t) = PES_1(t) - PES_2(t)$$
$$= PES_{True}(t) + n_1(t) - (PES_{True}(t) + n_2(t))$$
$$= n_1(t) - n_2(t)$$

Therefore, the proposed technique of the present invention for measuring the variance of $\Delta(t)$ gives a direct and robust measurement of position error noise. In implementation, this variance can be minimized by optimally setting the cut-off frequency of each servo read channel filter and/or by otherwise conditioning the signals as function thereof. The present invention contemplates determining the optimum setting of each servo read channel cut-off frequency by using any number of classic optimization algorithms (e.g. Steepest Descent Method, Gauss-Newton Method, Nelder-Mead Simplex Method, etc.).

As described above, the present invention contemplates the system of the present invention being used in any number of environments. The system may be used in a manufacturing process to test manufacturing variances in the media elements. This may include optimizing the servo system to limit noise and using the optimized system to read servo patterns from multiple media elements. In particular, servo patterns may be read with the optimized servo system to quality check the servo patterns.

The optimized servo system may be used with a benchmarked servo pattern to determine differences between the benchmarked servo pattern and tested servo patterns. If the difference therebetween are within an acceptable range, then the tested servo patterns may pass inspection, and if the difference is outside of the acceptable range, then the media elements associated therewith may be removed for further processing. Optionally, the media element having the benchmarked servo pattern may used to test operation of media devices used to read the media element. For example, in mass production environments, a benchmarked media element having a benchmarked servo pattern may be inserted into a number of reading elements, such as tape-drives, to test the operation thereof.

The present invention may also be use for in-line processing where the filters may be optimized once in the field, such as through an algorithm or other automatically executed logic in the controller. In more detail, once in use, the controller may be configured to adjust the optimize the filter, as described above. This may be advantageous in limiting manufacturing and quality control costs.

Similar logic may be used to provide a robust system for automatically optimizing the system according to different types of media elements and different environments of use. Various types of media elements, or the different environments associated with the use thereof, may cause, contribute, or influence noise generation in various ways. The ability of the present invention to automatically optimize the filters to limit noise may be advantageous in providing a robust, one size fits all solution, whereby a common servo system can be used for each media element and each environment of use as the controller can automatically optimize the filters to the particular application, rather than requiring such optimization during the manufacturing thereof.

Typically, the task of differentiating the noise variation from the true position variation in the PES is difficult. In its general form, the present invention requires the measurement of the PES variation which can be measured in a variety of ways (e.g., appropriate filtering of a single read channel, special servo patterns, etc.). In its preferred embodiment, the present invention uses a technique of measuring the PES measurement noise via the use of a plurality of independent servo reader measurements. The advantage of this aspect of the present invention is that it provides a robust and inexpensive method for measuring the PES sensor noise variation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of measuring noise in a servo system having a media head to read media signals from a media element, the method comprising:
   determining position error signals (PES) as a function of signals collected by two servo readers, the servo readers reading servo patterns included on the media element;
   subtracting the PES of one of the servo readers from the other servo reader to determine PES noise;
   characterizing the PES noise filtering the signals collected by the servo readers prior to determining the position error signals; and
   optimizing the PES noise by adjusting the filtering according to a PES noise optimization strategy.

2. The method of claim 1 wherein characterizing the PES noise includes determining a variance of the PES.

3. The method of claim 1 further comprising modifying the signals collected by the servo readers prior to determining the position error signals.

4. The method of claim 1 wherein adjusting the filtering includes adjusting a cut-off frequency of at least one of the filters.

5. The method of claim 1 wherein adjusting the filtering includes adjusting a cut-off frequency of both filters.

6. The method of claim 1 wherein the filtering is adjusted according to a Steepest Descent Optimization Method, a Gauss-Newton Optimization Method, or a Nelder-Mead Simplex Optimization Method.

7. The method of claim 1 further comprising positioning the head based on the PES determined after implementing the noise optimization strategy.

8. The method of claim 1 further comprising changing the media element to a new media element and optimizing noise in the servo system for the new media element.

9. The method of claim 1 further comprising benchmarking a servo pattern of a media element after adjusting the filtering and testing operation of a plurality of media read devices as a functions of signals read from the benchmarked servo pattern.

10. The method of claim 1 wherein the media element is a magnetic tape or a magnetic disc.

11. A method of positioning a media head to read media signals from a media element in a servo system, the method comprising:
   determining position error signals (PES) based on signals collected by two servo readers, the servo readers reading servo patterns included on the media element;
   subtracting the PES of one of the servo readers from the other servo reader to isolate PES noise;
   calculating a PES noise value for the PES noise;
   applying a PES noise optimization strategy to optimize the PES noise value; and
   positioning the head based on PES determined after implementing the PES noise optimization strategy.

12. The method of claim 11 wherein the optimization strategy includes filtering the signals received by the servo readers to limit noise.

13. The method of claim 12 wherein each servo reader includes a filter, and wherein the filtering includes adjusting a cut-off frequency of at least one of the filters.

14. The method of claim 12 wherein each servo reader includes a filter, and wherein the filtering includes adjusting a cut-off frequency of both filters.

15. The method of claim 12 wherein the filtering is adjusted according to a Steepest Descent Optimization Method, a Gauss-Newton Optimization Method, or a Nelder-Mead Simplex Optimization Method.

16. A method of testing servo pattern quality of servo patterns included on a media element, the method comprising:
   providing a tape head having two servo readers;
   providing a benchmarked servo pattern;
   determining a position error signal (PES) for each of the servo readers as a function of signals collected by the servo readers from the benchmarked servo patterns;
   optimizing the servo readers as a function of a noise value associated with a difference in noise between the PES signals of the two servo readers;
   determining a benchmarked PES noise value as a function of signals collected from the benchmarked servo pattern after the optimizing of the servo readers;
   determining a non-benchmarked PES noise value as a function of signals collected from a non-benchmarked servo pattern after the optimizing of the servo readers; and
   outputting a servo pattern quality of the non-benchmarked servo pattern as a function of a difference between the benchmarked PES noise value.

17. The method of claim 16 further comprising optimizing the servo readers by adjusting filtering of the servo readers according to a PES noise optimization strategy.

18. The method of claim 17 wherein each servo reader includes a filter, and wherein optimizing the PES noise includes adjusting a cut-off frequency of at least one of the filters.

* * * * *

UNITED STATES PATENT AND TRADEMARK OFFICE
CERTIFICATE OF CORRECTION

| | | |
|---|---|---|
| PATENT NO. | : 7,328,138 B1 | |
| APPLICATION NO. | : 11/186664 | |
| DATED | : February 5, 2008 | |
| INVENTOR(S) | : Steven G. Trabert et al. | |

It is certified that error appears in the above-identified patent and that said Letters Patent is hereby corrected as shown below:

Column 8, Line 21, Claim 16:

After "noise value" insert:

-- and the non-benchmarked PES noise value --.

Signed and Sealed this

Third Day of June, 2008

JON W. DUDAS
*Director of the United States Patent and Trademark Office*